Feb. 15, 1944.   J. W. MILLER   2,341,801
MOTOR SHIPPING CONTAINER
Filed April 21, 1942   2 Sheets-Sheet 1

INVENTOR
JOHN W. MILLER
BY Susan Frye & Hardesty
ATTORNEYS

Feb. 15, 1944. J. W. MILLER 2,341,801
MOTOR SHIPPING CONTAINER
Filed April 21, 1942 2 Sheets-Sheet 2

INVENTOR
JOHN W. MILLER
BY Swan, Frye & Hardesty
ATTORNEYS

Patented Feb. 15, 1944

2,341,801

UNITED STATES PATENT OFFICE 2,341,801

MOTOR SHIPPING CONTAINER

John W. Miller, Detroit, Mich.

Application April 21, 1942, Serial No. 439,887

6 Claims. (Cl. 206—46)

The present invention relates to containers or crates for use in shipping, storing, or servicing engines, particularly aircraft engines.

Among the objects of the invention is a device of the kind indicated which includes engine supporting means upon which the engine may be fixed upon completion and upon which it may remain while being shipped or stored, or during final adjustment or other servicing, until removed for installation.

Another object is an engine supporting means which is collapsible into small space after removal of the engine so that it may be returned for re-use.

Still another object is an engine support and cover therefor, which, while effectively protecting the engine permits moving, hoisting or otherwise handling the enclosed engine without substantial danger of injury.

Other objects will readily occur to those skilled in the art upon reference to the following description and the accompanying drawings in which Figure 1 is side elevation of the support and cover with an engine (in outline) mounted therein, part of the cover being broken away.

Figure 1:
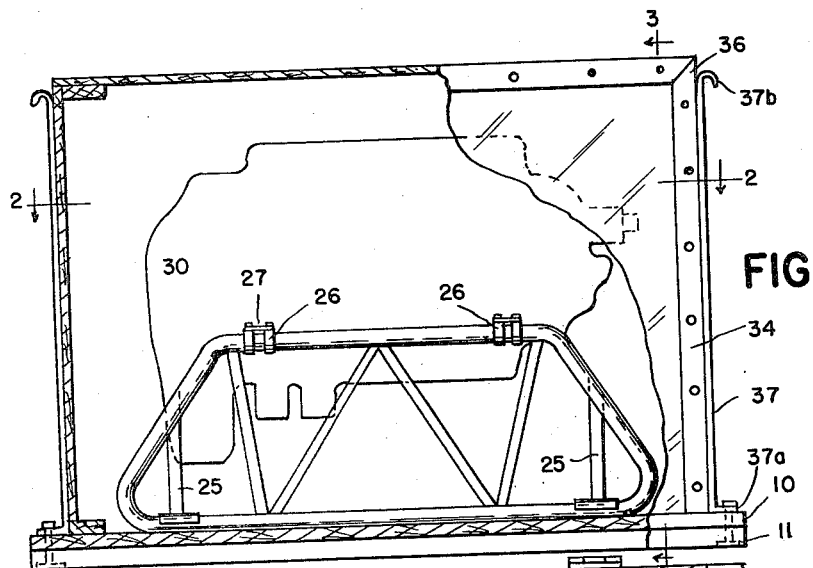
Figure 2:
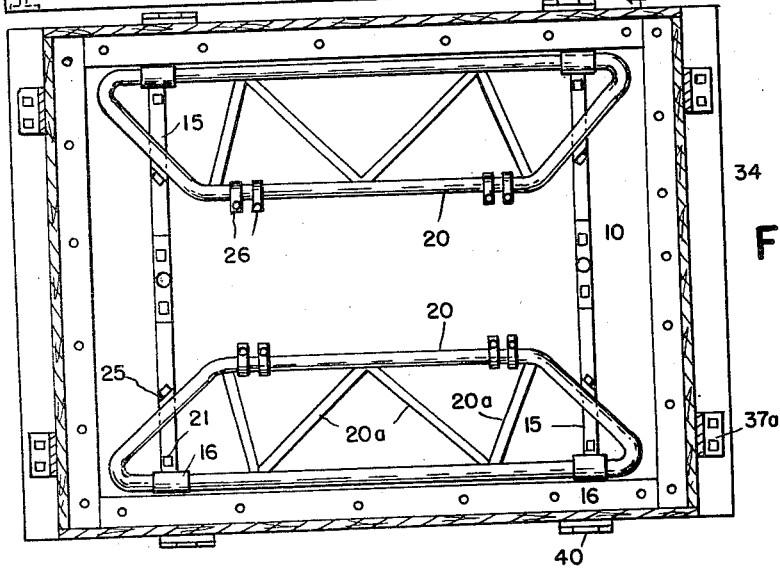
Figure 2 is a horizontal section thereof on the line 2—2, the engine outline being omitted.
Figure 6:
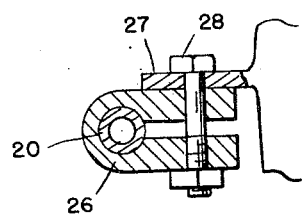
Figures 5 and 6 are sectional views showing details of construction.
Figure 3:
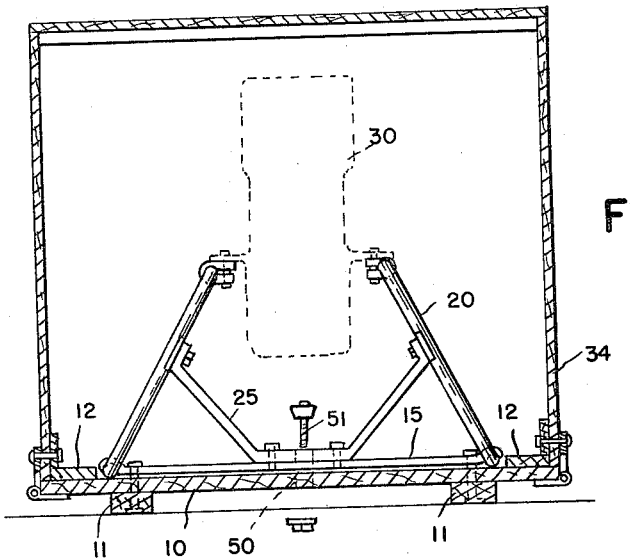
Figure 3 is a vertical section on line 3—3 of Figure 1.

In the drawings, the engine support is shown to consist of a rectangular base of suitable heavy planks 10 fixed upon longitudinal timbers or skid pieces 11, and having fixed thereon the longitudinal members 12 serving to guide the cover.

Figure 5:
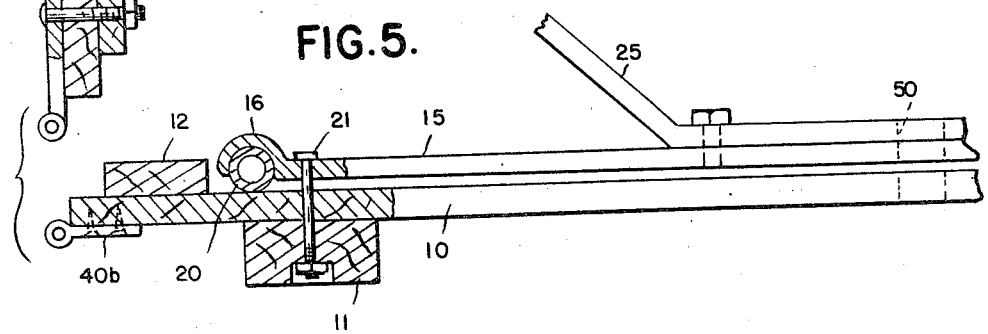

Upon the base or floor so produced and near the ends are fixed heavy metal hold-down members 15, these being flat through the greater portion of their length but having at their ends hooked portions 16 (see Fig. 5) adapted to overlie and hold the engine supporting truss members 20.

The truss members 20 are preferably formed by welding tubing into loops of the shape shown, that is, trapezoidal, with the longer base clamped under the hooked portions 16 and resting on the base 10. These truss members 20 preferably overlie the skid pieces 11 and are firmly positioned by the hooked ends 16 being securely anchored by the bolts 21 extending through members 15 and skid pieces 11 (see Fig. 5).

The truss members 20 are arranged to incline toward each other and are fixed in this position by the diagonal braces 25 bolted to the members 15 and extending upward to intermediate portions of the legs of the trapezoidal truss members and bolted thereto.

As shown, the upper sides of the truss members 20 are provided with embracing clamps 26 upon which rest the mounting pads 27 of an engine 30, the pad and clamp being fixed together by bolts 28 also serving to fix the clamp against movement.

In order to insure a sufficient strength to the truss members 20 they may of course be provided with diagonal brace members 20a preferably welded to the tubing, and instead of forming the truss members of tubing, it is of course, obvious that other suitable form of material may be used.

When the engine 30 has been fixed in position, it is readily accessible for servicing or other work, but for shipping or storing a protective cover 34 is necessary.

Figure 4:
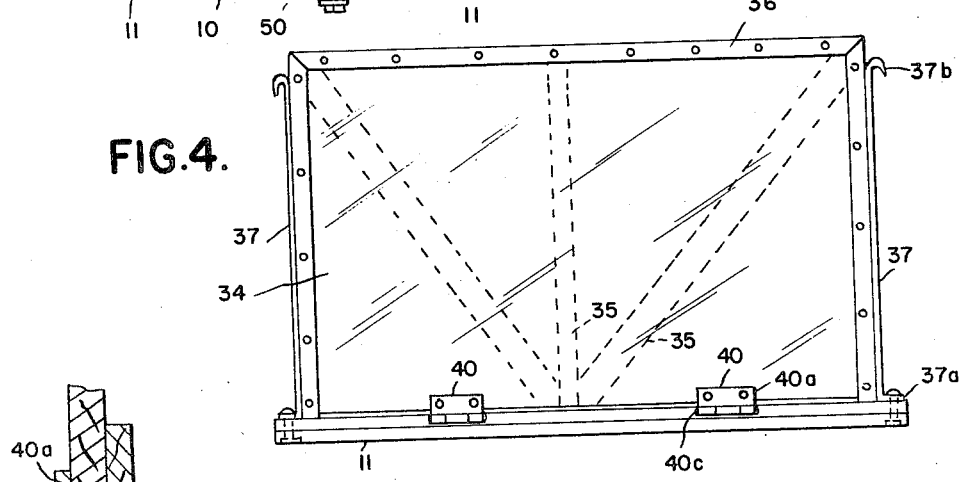
Figure 4 is a side elevation of the complete enclosure ready for shipping or storage.

Such a cover is shown in Figs. 1 to 4 and may consist of walls and top of any suitable material such as wood or metal preferably reinforced, as indicated in Fig. 4, by members 35, and bound along its angles or corners with suitable angle irons 36.

The cover 34 is also provided at each end with metal elements 37 extending from the bottom to a point near the top. Each of these members 37 is provided with a foot 37a providing means for bolting to the base member 10 and with a hook 37b at its upper end. The hook 37b, of course, provides easy attachment for a suitable hoist for handling.

Suitable means for fixing the cover in place is shown at 40, as consisting of hinge leaves 40a and 40b (Fig. 5) and a hinge pin 40c.

It is preferred also to provide an opening 50 through the members 15, 24 and the base 10 for the passage of a hold-down bolt 51, in case it is desirable to fix the crated engine to the floor of a conveyance.

The structure described provides a mounting means for engines that may be used as a stand for service, testing or other purpose and may accompany the engine to the point of actual engine installation, servicing as a convenient handling means. Further, after the engine has been removed, the base portion may be collapsed to small space and returned for further use.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. Support means for an engine, consisting of a base, spaced longitudinal skids fixed to the underside thereof, truss members hinged to the upper side of said base and overlying said skid members, said truss members having upper longitudinal chord portions parallel to said base, means for fixing said truss members in an erected position and means for clamping said engine to said chord portions.

2. Support means for an engine consisting of a base adapted to form the bottom of an enclosing crate, spaced longitudinal skids fixed to the underside of said base, engine supporting skeletonized members hinged to said base in registry with said skids, means for maintaining said supporting members in erected position, means for fixing an engine to the latter, a cover member adapted to envelop said engine and supporting members, means for fixing said cover member to said base, vertically arranged separate members carried by said cover member, means for fixing said separate members to said base and means carried by said separate members for providing attachment for a suitable hoist.

3. Support means for an engine, consisting of a base, spaced longitudinal skids fixed to the underside thereof, truss members hinged to the upper side of said base, said truss members having upper longitudinal chord portions parallel to said base, means for fixing said truss members in an erected position, and means for clamping said engine to said chord portions.

4. Support means for an engine, consisting of a base, spaced longitudinal skids fixed to the underside thereof, truss members hinged to the upper side of said base and overlying said skid members, said truss members having upper longitudinal chord portions parallel to said base, means for fixing said truss members in an erected position, said means comprising brace members fixed to said base and to said truss members intermediate their height, and means for clamping said engine to said chord portions.

5. Support means for an engine, consisting of a base, spaced longitudinal skids fixed to the underside thereof, truss members hinged to the upper side of said base and overlying said skid members, said truss members having upper longitudinal chord portions parallel to said base, means for fixing said truss members in an erected position, and clamp means adapted to fix said engine to said chord portion, said clamp means embracing said chord portion and being fixed against longitudinal movement thereon.

6. A device of the character described consisting of a rectangular base, metallic members fixed across the base near the ends thereof, truss members extending longitudinally of and hinged to said base near the lateral edges thereof, said metallic members having their ends forming hinge portions for said truss members overlying portions of the latter to thereby fix them to said base and brace members fixed to said truss members and to said metallic members to maintain said truss members in erected position.

JOHN W. MILLER.